United States Patent
Inoue et al.

(10) Patent No.: US 12,320,739 B2
(45) Date of Patent: *Jun. 3, 2025

(54) METHOD FOR EVALUATING DELAYED FRACTURE OF METAL MATERIAL

(71) Applicant: JFE STEEL CORPORATION, Tokyo (JP)

(72) Inventors: Naho Inoue, Tokyo (JP); Shinji Otsuka, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 42 days.

This patent is subject to a terminal disclaimer.

(21) Appl. No.: 17/797,366

(22) PCT Filed: Feb. 9, 2021

(86) PCT No.: PCT/JP2021/004831
§ 371 (c)(1),
(2) Date: Aug. 3, 2022

(87) PCT Pub. No.: WO2021/162006
PCT Pub. Date: Aug. 19, 2021

(65) Prior Publication Data
US 2023/0074839 A1  Mar. 9, 2023

(30) Foreign Application Priority Data
Feb. 14, 2020 (JP) ................... 2020-023094

(51) Int. Cl.
*G01N 17/00* (2006.01)
(52) U.S. Cl.
CPC ................ *G01N 17/006* (2013.01)

(58) Field of Classification Search
CPC ..................................... G01N 17/006
USPC ............................................. 73/86
See application file for complete search history.

(56) References Cited

U.S. PATENT DOCUMENTS

| | | | |
|---|---|---|---|
| 2012/0103104 A1* | 5/2012 | Butterfield | G01N 17/043 73/856 |
| 2014/0202879 A1 | 7/2014 | Bennett | |
| 2016/0363526 A1 | 12/2016 | Samusawa et al. | |

FOREIGN PATENT DOCUMENTS

| | | |
|---|---|---|
| CN | 104685350 A | 6/2015 |
| CN | 204832000 U | 12/2015 |
| CN | 106030281 A | 10/2016 |
| EP | 2905612 A1 | 8/2015 |
| JP | 2005-134152 A | 5/2005 |

(Continued)

OTHER PUBLICATIONS

Akioka et al. Machine Translation of WO-2019186940-A1. Published Oct. 2019. Accessed Mar. 2024. (Year: 2019).*

(Continued)

*Primary Examiner* — Walter L Lindsay, Jr.
*Assistant Examiner* — Philip T Fadul
(74) *Attorney, Agent, or Firm* — Oliff PLC

(57) ABSTRACT

A method for evaluating the delayed fracture characteristics of a metal material. The method including placing a solution-retaining material impregnated with a solution containing a chloride and having a pH of 3.5 or more on an edge face of the metal material, and maintaining a state in which the solution-retaining material is held at a deliquescence humidity of the chloride to thereby corrode the edge face.

7 Claims, 2 Drawing Sheets

(56) References Cited

FOREIGN PATENT DOCUMENTS

| JP | 2005-181102 A | 7/2005 |
| JP | 2007-199024 A | 8/2007 |
| JP | 2008-151675 A | 7/2008 |
| JP | 2012-83140 A | 4/2012 |
| JP | 201699259 A | 5/2016 |
| JP | 2016-180658 A | 10/2016 |
| JP | 2018-185184 A | 11/2018 |
| JP | 2019-32173 A | 2/2019 |
| KR | 20040039892 A | 5/2004 |
| WO | WO-2019186940 A1 * | 10/2019 |

OTHER PUBLICATIONS

Apr. 6, 2021 International Search Report issued in International Patent Application No. PCT/JP2021/004831.
Feb. 8, 2022 Office Action issued in Japanese Patent Application No. 2021-526785.
Jun. 19, 2023 Search Report issued in European Patent Application No. 21753438.7.
Aug. 23, 2024 Office Action issued in Korean Patent Application No. 10-2022-7026758.
Mar. 1, 2024 Office Action issued in U.S. Appl. No. 17/797,285.
Oct. 15, 2024 Office Action issued in Chinese Patent Application No. 202180012423.3 (with concise statement of relevance in English).
Jan. 15, 2025 Office Action issued in European Patent Application No. 21753438.7.
Jan. 26, 2025 Office Action issued in Chinese Patent Application No. 202180012423.3 (with concise explanation in English).
Liu, "Chemical equipment corrosion and protection," Lanzhou University Press, Chapter 1 Basic knowledge of metal corrosion, pp. 19-21, Dec. 31, 2018.
Feb. 25, 2025 Written Decision on Registration issued in Korean Patent Application No. 10-2022-7026758.

* cited by examiner

NN  BN

METHOD FOR EVALUATING DELAYED FRACTURE OF METAL MATERIAL

TECHNICAL FIELD

This application relates to a delayed fracture evaluation method for evaluating the delayed fracture characteristics of edge faces of metal materials used in a wet corrosive environment.

BACKGROUND

When hydrogen enters automotive parts materials with increased strength, a phenomenon called "delayed fracture" occurs in which mechanical properties such as elongation deteriorate. It is known that the delayed fracture of a material is induced by an increase in the amount of hydrogen entering the material and that the sensitivity to delayed fracture increases as the strength of the material and the stress applied thereto increase. In particular, to produce automotive parts, a steel sheet used as a raw material (blank sheet) is generally sheared and trimmed into a prescribed shape or drilled in many cases, and one problem in the worked metal material is delayed fracture at its edge faces.

For evaluating delayed fracture, an acid immersion test, a cathodic charging test, a corrosion test, etc. have conventionally been used to introduce hydrogen. Non Patent Literature 1 describes a technique for evaluating delayed fracture characteristics by immersing a material in an aqueous hydrochloric acid solution to introduce hydrogen into the material. Patent Literature 1 describes a technique for simply evaluating delayed fracture characteristics by introducing hydrogen into a steel sheet with stress applied thereto by a cathodic charging test.

Patent Literature 2 describes a technique for simply evaluating delayed fracture characteristics of a metal material used in an atmospheric corrosive environment. Specifically, in this technique, a dry-wet process that occurs in an atmospheric corrosive environment during day and night is simulated to evaluate the delayed fracture characteristics of the material subjected to corrosion. Patent Literature 3 describes an electrochemical corrosion evaluation method that uses a water-containing material with attention given to the shape of an automotive part used as a test object. Specifically, in this laboratory corrosion resistance evaluation method, a water-containing muddy material is used to reduce the influence of surface irregularities.

CITATION LIST

Patent Literature

PTL 1: Japanese Unexamined Patent Application Publication No. 2005-134152
PTL 2: Japanese Unexamined Patent Application Publication No. 2016-180658
PTL 3: Japanese Unexamined Patent Application Publication No. 2019-32173

Non Patent Literature

NPL 1: Tetsu-to-Hagane (The journal of the Iron and Steel Institute of Japan), Vol. 79, No. 2, Page 227-232

SUMMARY

Technical Problem

As described above, delayed fracture often occurs in portions of metal materials that have been subjected to shearing or drilling, and it is necessary to evaluate the delayed fracture at edge faces of these worked metal materials. The evaluation methods described in Non Patent Literature 1, Patent Literature 1, and Patent Literature 3 can also be used to test the edge faces. However, in the tests in Non Patent Literature 1 and Patent Literature 1, a wet corrosive environment in which test materials are in a wet state because of snowfall, rainfall, or splashing is not taken into consideration, and it is therefore difficult to determine the delayed fracture characteristics in an actual environment.

Patent Literature 2 is premised on the direct evaluation of the delayed fracture characteristics of materials because the test is performed in an environment in which a dry-wet behavior occurs during day and night. However, automobiles are used in various environments, and it is not assumed that this test is used in snowy areas and in an environment in which a flood occurs. The object of Patent Literature 3 is penetration into a surface-treated film using a water-containing material and differs from the idea of the disclosed embodiments, i.e., maintenance of the thickness of a liquid film.

The disclosed embodiments have been made in view of the foregoing circumstances, and it is an object to provide a method for evaluating delayed fracture of metal materials. The method can accurately evaluate the delayed fracture characteristics of edge faces of the metal materials in a wet corrosive environment such as a snowfall, rainfall, or splashing environment.

Solution to Problem

The present inventors have conducted studies to achieve the foregoing object, and the embodiments are summarized as follows.

[1] A method for evaluating delayed fracture characteristics of an edge face of a metal material, the method including: placing a solution-retaining material impregnated with a solution containing a chloride and having a pH of 3.5 or more on the edge face; and maintaining a state in which the solution-retaining material is held at a deliquescence humidity of the chloride to thereby corrode the edge face.

[2] The method for evaluating the delayed fracture characteristics of the metal material according to [1], wherein the corrosion is allowed to continue while a thickness of a liquid film of the solution is maintained at from 10 μm to 2500 μm inclusive.

[3] The method for evaluating the delayed fracture characteristics of the metal material according to [1] or [2], wherein the corrosion is performed at a test temperature of −50 to 60° C.

[4] The method for evaluating the delayed fracture characteristics of the metal material according to any of [1] to [3], wherein, after the solution containing the chloride and having a pH of 3.5 or more is supplied to the edge face, the solution-retaining material is placed on the edge face.

[5] The method for evaluating the delayed fracture characteristics of the metal material according to [4], wherein the solution is supplied by one of immersion for shorter than 15 minutes, atomizing, showering, and dropwise addition.

[6] The method for evaluating the delayed fracture characteristics of the metal material according to any of [1] to [5], wherein the metal material is a steel sheet having a tensile strength of 1180 MPa or more.

Advantageous Effects

According to the disclosed embodiments, the delayed fracture characteristics of an edge face of a metal material in a wet corrosive environment such as a snowfall, rainfall, or splashing environment can be evaluated accurately.

DETAILED DESCRIPTION

Figure 1:
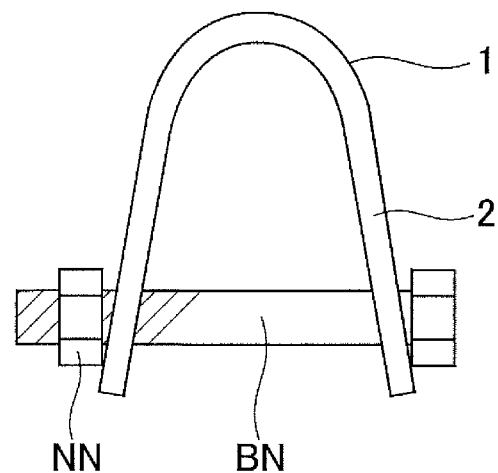
FIG. 1 A schematic illustration showing an example of a test specimen used for a delayed fracture evaluation method.

Disclosed embodiments will now be described. The following description of the preferred embodiment is merely exemplary in nature and is not intended to limit its application or use. The present inventors have evaluated the delayed fracture characteristics of high strength steel sheets used for automobiles in various actual environments. Then the inventors have clarified that delayed fracture is likely to occur particularly in an environment in which a snow melting salt is scattered. This is because snow and mud swirled by running automobiles and adhering to the surfaces of the steel sheets maintain the wet state of the surfaces thereof, so that the corrosive conditions are severest.

It has been found that, when a surface of a metal material and its edge face are placed in the same corrosive environment, the corrosive environment serving as a delayed fracture environment is severer for the edge face than for the surface of the metal material. Moreover, the number of cracks generated in a test specimen having exposed edge faces was larger than that in a test specimen having sealed edge faces. Thus, the inventors have found that it is necessary to perform a test for evaluating the delayed fracture characteristics of edge faces of a metal material in a wet corrosive environment such as a snowfall, rainfall, or splashing environment in addition to the evaluation of the delayed fracture characteristics of the surface of the metal material.

The inventors have also found that the wet state is maintained not only on the surface of the metal material but also on the edge faces due to the adhesion of snow and mud. It has been found based on these results that it is necessary to maintain a uniform wet state on the edge faces in the evaluation test also.

Accordingly, the method for evaluating the delayed fracture of a metal material according to the disclosed embodiments is performed by: placing a solution-retaining material impregnated with a solution containing a chloride and having a pH of 3.5 or more on an edge face of the metal material; and maintaining a state in which the solution-retaining material is held at a deliquescence humidity of the chloride to thereby corrode the edge face. In the following exemplification of the embodiment, the delayed fracture evaluation method performed includes: (1) a supplying step of supplying the solution containing the chloride and having a pH of 3.5 or more to the edge face of the metal material; and (2) a corroding step of corroding the metal material by placing the metal material with the solution supplied thereto in an environment with a test temperature of −50 to 60° C. and a humidity equal to or higher than the deliquescence humidity of the chloride while the liquid film of the solution is maintained.

First, to specifically evaluate the delayed fracture characteristics, it is necessary that the metal material have a worked edge face. Examples of the working method include shearing, drilling, and laser processing. Examples of the method for evaluating the delayed fracture characteristics include an evaluation method using residual stress remaining after working and also include a method in which the shape of the metal material is fixed with stress applied thereto using a bolt.

In particular, the metal material used for the evaluation is a steel material such as a steel sheet having a tensile stress TS of 1180 MPa or more, but this is not a limitation. Other metal materials such as Ti and Al may be used. Moreover, the metal materials include coated metal materials.

(1) Supplying Step

The supplying step is the step of supplying the solution containing a chloride and having a pH of 3.5 or more to the edge face of the metal material. If the pH of the solution is lower than 3.5, dissolution of the metal material is facilitated. As the metal material dissolves in the solution, hydrogen ions in the solution are reduced, so that intrusion of hydrogen into the metal material is facilitated. Specifically, if the pH of the solution is lower than 3.5, the environment of the test is severer than the actual environments, and the delayed fracture characteristics in the actual environments cannot be tested accurately. Therefore, the pH of the solution used is 3.5 or more. In the actual corrosive environments, the solution is neutral, and the pH of the solution is preferably 5 to 9.

The chloride is a general cause for the actual corrosive environments and is therefore contained in the solution. The edge face of the metal material may be simply covered with snow that contains no chloride. However, even when the edge face of the metal material is covered with snow, the edge face may be affected by a snow melting salt. Therefore, the above solution contains the chloride. In this case, the chloride is contained in the solution as chloride ions.

The chloride ions mean Cl ions in Cl ion-containing salts such as NaCl, $MgCl_2$, and $CaCl_2$, and the solution contains at least one of the above chloride components. Water is used as a solvent, and the solution may contain only one chloride such as NaCl, $MgCl_2$, or $CaCl_2$. The solution may contain a plurality of chlorides and may contain a component other than the chlorides. Examples of the component other than the chlorides include, but not limited to, sulfides and nitric acid compounds contained in the environment and urea mixed in the snow melting agent and scattered. Considering the actual environments, the solution caused to adhere to the metal material is preferably a solution composed mainly of NaCl, for example, salt water.

The solution is a liquid state mixture of two or more materials. The solution used may be, for example, an aqueous solution containing a liquid component composed of water as a solvent and any of the above-described chlorides as a solute. In particular, in the solution used for the delayed fracture test, the chloride accounts for 50 to 100% by weight of the solutes and preferably 70% by weight or more. By increasing the weight ratio of the chloride as described above, the deliquescence humidity described later can be easily controlled. No limitation is imposed on the concentrations of the solutes and the solvent in terms of % by weight so long as no operational inconvenience occurs. For example, when the volume of NaCl is equal to or more than one half of the volume of the solution, the amount of NaCl is larger than its saturation amount, so that precipitation occurs. In this case, the solution cannot be supplied uniformly and is therefore not suitable for the disclosed embodiments.

No particular limitation is imposed on the method for supplying the solution to the edge face of the metal material. Specific examples include: an immersion method in which a test specimen is immersed in the solution (for shorter than 15 minutes and preferably shorter than 10 minutes) and removed therefrom to cause the solution to adhere to the surface of the test specimen; a method in which the solution is applied to the metal material by spraying or showering; a method in which the solution is caused to adhere by atomizing; a method in which a prescribed amount of the solution is added dropwise using a pipet; and a method in which a solution-retaining material such as gauze impregnated with the solution is placed on the edge face. If the immersion is performed for longer than 15 minutes to cause the solution to adhere, corrosion proceeds in the solution. This differs from the corrosion mode of the disclosed embodiments and is not suitable. The spraying means that droplets of the solution of 50 μm or larger are injected, and the atomizing means that droplets of the solution of smaller than 50 μm are injected.

In the supplying step, the solution may be supplied by placing the solution-retaining material such as gauze impregnated with the solution to be used in the corroding step on the edge face. In this case, the corroding step described below is performed using the solution-retaining material placed in the supplying step. In this manner, the actual corrosive environment in which the state remains unchanged from the supplying step to the corroding step can be reproduced, and the accuracy of the test can be improved.

(2) Corroding Step

In the corroding step, the solution-retaining material impregnated with the solution is disposed on the edge face of the metal material, and the state in which the solution-retaining material is held at the deliquescence humidity of the chloride is maintained to corrode the edge face of the metal material.

In the corroding step, it is necessary to continue holding the solution on the edge face of the metal material, and the thickness of the film of the solution is an important factor that has a significant influence on the delayed fracture characteristics. Using different liquid film thicknesses, the delayed fracture characteristics at these liquid film thicknesses were actually evaluated. It was found that the delayed fracture characteristics can be evaluated when at least the liquid film is present on the edge face (the liquid film is thicker than 0 μm). The liquid film thickness is obtained from the results of conversion of a value obtained by an ACM sensor (manufactured by Syrinx Inc.) to the liquid film thickness. In particular, it is preferable to maintain the liquid film thickness steadily at from 10 μm to 2500 μm. If the liquid film thickness is less than 10 μm, the liquid film formed is not sufficient, and the degree of corrosion is lower than that in a test in an actual environment. In this case, although a critical load stress coincides with that in the actual environment, the corrosion mode (corrosion type) may differ from that in the actual environment. Similarly, if the liquid film thickness exceeds 2500 μm, the liquid film thickness is excessively large. In this case also, although the critical load stress obtained coincides with that in the actual environment, the corrosion mode (corrosion type) may differ from that in the actual environment. Therefore, the liquid film thickness is from 10 μm 2500 μm. The liquid film thickness in the corroding step is controlled mainly by the amount of the solution supplied in the supplying step described above and the amount of the chloride described later.

No particular limitation is imposed on the test temperature in the corroding step, but the test is performed in an environment with a test temperature of, for example, −50 to 60° C. This test temperature was defined based on measurements in actual environments. It has been found that, in some environments in which a snow melting salt is used, the temperature can reach −50° C. When an automobile is parked in direct sunlight, the temperature of body parts of the automobile can reach as high as 60° C. Therefore, the temperature range in the disclosed embodiments is set to −50 to 60° C. Considering the range of the test temperature achievable in a general purpose apparatus, the test temperature is preferably −20 to 40° C.

In the corroding step, the relative humidity of the test environment is one of the significant factors, and it has been found from various experiments that it is necessary to steadily maintain the state in which the edge face wet with the solution is not dried in the corroding step. The wet state in which the edge face is not dried means that one continuous liquid film (the liquid film thickness is preferably equal to or more than 10 μm) is formed on the edge face of the metal material without discontinuities. When discontinuities occur in the liquid film, the amount of the chloride is nonuniform in the test area. This is significantly different from the state in actual environments and is not preferred. To form one continuous liquid film without discontinuities, the wet state must be maintained with only minor fluctuations.

Therefore, the corroding step is performed in an environment with a humidity equal to or higher than the deliquescence humidity of the chloride. The deliquescence humidity is the humidity at which moisture absorption by the chloride (deliquescence of the chloride) causes the surface of the test specimen to be wet. In this manner, the above-described state in which the solution on the edge face is not dried can be maintained. The deliquescence humidity is determined by the type of chloride supplied to the edge face, i.e., the type of chloride in the solution. For example, when a salt composed mainly of NaCl is used, the relative humidity is set to 75% RH or higher. When a salt composed mainly of $MgCl_2$ is used, the relative humidity is set to 33% RH or higher. When a salt composed mainly of KCl is used, the relative humidity is set to 84% RH or higher. The environment is controlled uniformly such that the humidity does not fluctuate. Allowable fluctuations in the liquid film thickness in the corroding step are ±10% of the set value thereof. Fluctuations exceeding these values are not suitable because unevenness of the evaluation results occurs.

As described above, the amount of the chloride in the solution and the relative humidity of the test environment are set such that the liquid film thickness is maintained without discontinuities. Specifically, the liquid film thickness is determined by the relative humidity of the test environment and the amount of the chloride. It is difficult to reproduce an actual environment either when the amount of the chloride is excessively large or excessively small. The amount of the chloride that allows the above-described liquid film thickness to be maintained is preferably 1000 to 200000 $mg/m^2$.

For example, in an environment with a temperature of 25° C. and a humidity of 95% RH, the liquid film thickness is about 10 μm when the amount of the chloride is 0.1 $g/m^2$ and is about 100 μm when the amount of the chloride is 1 $g/m^2$. Based on consideration of the liquid film thickness from the viewpoint of controlling the amount of the chloride supplied and the relative humidity, the liquid film thickness in the corroding step is preferably 40 to 1500 m. The relative humidity of the test environment is more preferably 90% RH so that the results of experiments are not affected even when the relative humidity of the test environment fluctuates ±5% RH.

Moreover, in the corroding step, the solution-retaining material impregnated with the solution is placed on the edge face of the metal material such that the state in which the solution supplied in the supplying step is retained is maintained. In this manner, the wet state of the edge face of the metal material can be maintained reliably. The solution-retaining material may be a material such as cotton gauze or mud that has void spaces thereinside so that the solution retained by capillarity can be maintained. In order not to inhibit corrosion, the solution-retaining material is preferably a material that can transmit oxygen. To steadily maintain the wet state of the edge face of the metal material, it is preferable not to move the solution-retaining material during the test. The supplying step may be performed only once at the beginning, or the supplying step and the corroding step may be repeated. When the supplying step and the corroding step are repeated, it is preferable to perform the corroding step for 100 hours or longer.

EXAMPLES

Example 1

First, whether the delayed fracture test method of the disclosed embodiments can simulate the actual corrosion was examined in Example 1 below. First, steel types A and B having compositions shown in Table 1 were used as metal materials serving as test specimens.

TABLE 1

|  | C (mass %) | Si (mass %) | Mn (mass %) | YS(MPa) | TS(MPa) |
|---|---|---|---|---|---|
| Steel type A | 0.45 | 0.20 | 0.73 | 1370 | 1500 |
| Steel type B | 0.21 | 0.33 | 1.60 | 1310 | 1520 |

Figure 2:
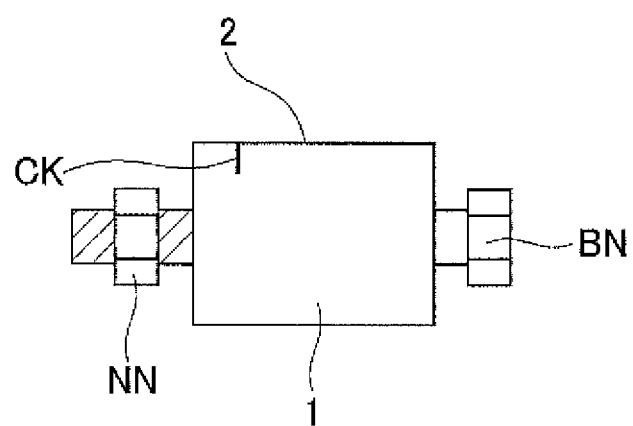
FIG. 2 A schematic illustration showing an example of the test specimen used for the delayed fracture evaluation method.
Figure 3:
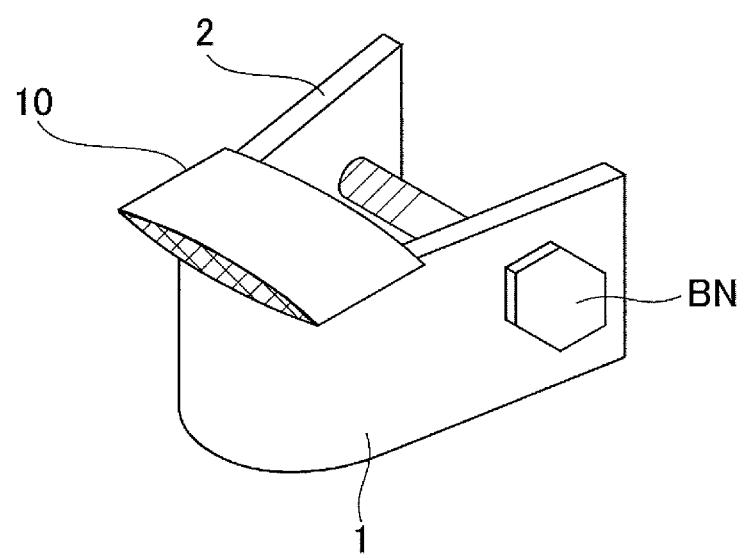
FIG. 3 A schematic illustration showing an example of the test specimen used for the delayed fracture evaluation method.

FIG. 1 is a schematic illustration showing an example of a test specimen used for the evaluation of delayed fracture. As shown in FIGS. 1 to 3, a 1.4 mm-thick steel sheet formed from steel type A or B was sheared to a width of 32.5 mm× a length of 100 mm to obtain a test specimen 1 for a test. Therefore, the test specimen 1 has a sheared edge face 2. A side different from the evaluation edge face was ground until the width of the specimen became 30 mm. Moreover, holes for a bolt were drilled at positions spaced apart from the center of the sheet.

This steel sheet for the test was immersed in toluene, subjected to ultrasonic cleaning for 5 minutes, and then bent 180°, and the test specimen 1 in a springback state was restrained by a bolt BN and a nut NN to thereby complete the test specimen 1. The test specimen 1 for the evaluation of delayed fracture has a bent portion with a bend radius R=7 mm, and a stress was supplied to a bent apex portion by adjusting the tightening width of the bolt BN and the nut NN. The larger the degree of tightening, the larger the load stress, and the severer the conditions. The stress applied to the bent apex portion by tightening is referred to as tightening stress. In the present Example, five levels of tightening stress including 800, 1000, 1200, 1400, and 1600 MPa were used. The tightening stress was determined by estimating the tightening width using CAE analysis based on the SS curve of the material used.

For the test specimens 1 using steel types A and B, an actual environment test including a fracture test was performed in an actual environment in a region in which a snow melting salt was actually scattered, and also a test using the delayed fracture evaluation method for metal materials according to the disclosed embodiments was performed.

<Actual Environment Test>

In the actual environment test, each test specimen 1 was placed in a lower portion of a mobile object that traveled every day on roads with a snow melting salt scattered thereon and collected 60 days after the start of the test. The reason that the specimens were placed in the lower portion of the mobile object is that the lower portion is affected by the snow melting salt. The results are shown in Table 2 below. The minimum load stress at which cracking occurred during the test was regarded as a border for the occurrence of cracking and defined as a critical load stress in the actual environment.

TABLE 2

| Steel type | Applied load stress (MPa) | Cracking evaluation result | Critical load stress (MPa) |
|---|---|---|---|
| A | 800 | ○ | 1400 |
|  | 1000 | ○ |  |
|  | 1200 | ○ |  |
|  | 1400 | x |  |
|  | 1600 | x |  |
| B | 800 | ○ | 1000 |
|  | 1000 | x |  |
|  | 1200 | x |  |
|  | 1400 | x |  |
|  | 1600 | x |  |

In Table 2, when a crack of 1 mm or longer was found in a test specimen 1, the condition of this test specimen was judged as cracked (symbol: x). When a crack of shorter than 1 mm or no cracking was found in a test specimen 1, the condition of this test specimen 1 was judged as not cracked (symbol: ○). FIG. 2 is a schematic illustration when a judgment portion is viewed from the apex of the U-bent test specimen. As shown in FIG. 2, the judgment was made using a crack (CK) starting from the evaluation edge face 2. Among the load stresses applied to test specimens 1 with cracks CK formed, the smallest load stress was defined as the critical load stress. The critical load stress of the steel A was 1400 MPa, and the critical load stress of the steel B was 1000 MPa.

<Test for Delayed Fracture Characteristics>

Next, as shown in FIG. 3, the same test specimens 1 as those in the actual environment test described above were used. In the corroding step, a solution-retaining member 10 was placed on the edge face 2 of each specimen to perform the delayed fracture evaluation method for metal materials described above. In this test, the maximum test period was 60 days, and the minimum load stress at which cracking occurred during the test period was regarded as the border for the occurrence of cracking and defined as the critical load stress. The critical load stress and the mode of corrosion (corrosion type) obtained in the delayed fracture characteristic test were compared with the critical load stress and the mode of corrosion (corrosion type) obtained in the actual environment test to determine whether the delayed fracture characteristic test is appropriate. The allowable test range of the relative humidity in the air atmosphere was the set value±5%.

The test conditions of the delayed fracture evaluation test and the results are shown in Table 3.

TABLE 3

| Test number | Steel type | Estimated liquid film thickness (computation)/μm | Relative humidity of the test environment % RH | Amount of chloride supplied/ mg/m² | Solution supplied | Test temperature/ ° C. | pH | Solution-retaining material | Supplying method | Critical load stress/ MPa | Compatibility with actual environment | |
|---|---|---|---|---|---|---|---|---|---|---|---|---|
| 1 | A | 0 | 70 | 10000 | Aqueous NaCl solution | 0 | 7.0 | Cotton gauze | Spraying | 1600 | x | Comparative Example |
| 2 | A | 5 | 85 | 1000 | Aqueous NaCl solution | 0 | 7.0 | Cotton gauze | Spraying | 1200 | B | Example |
| 3 | A | 9 | 95 | 700 | Aqueous NaCl solution | 0 | 7.0 | Cotton gauze | Spraying | 1200 | B | Example |
| 4 | A | 30 | 75 | 10000 | Aqueous NaCl solution | 0 | 7.0 | Cotton gauze | Spraying | 1200 | A | Example |
| 5 | A | 40 | 95 | 3000 | Aqueous NaCl solution | 0 | 7.0 | Cotton gauze | Spraying | 1200 | A | Example |
| 6 | A | 40 | 95 | 3000 | Aqueous NaCl solution | 0 | 7.0 | Cotton gauze | Dropwise addition | 1200 | A | Example |
| 7 | A | 40 | 95 | 3000 | Aqueous NaCl solution | 0 | 7.0 | Mud | Spraying | 1200 | A | Example |
| 8 | A | 125 | 95 | 10000 | Aqueous NaCl solution | −60 | 7.0 | Cotton gauze | Spraying | 1200 | B | Example |
| 9 | A | 125 | 95 | 10000 | Aqueous NaCl solution | −50 | 7.0 | Cotton gauze | Spraying | 1200 | A | Example |
| 10 | A | 125 | 95 | 10000 | Aqueous NaCl solution | −20 | 7.0 | Cotton gauze | Spraying | 1200 | A | Example |
| 11 | A | 125 | 95 | 10000 | Aqueous NaCl solution | 0 | 3.0 | Cotton gauze | Spraying | 1000 | x | Comparative Example |
| 12 | A | 125 | 95 | 10000 | Aqueous NaCl solution | 0 | 3.5 | Cotton gauze | Spraying | 1200 | A | Example |
| 13 | A | 125 | 95 | 10000 | Aqueous NaCl solution | 0 | 7.0 | Cotton gauze | Spraying | 1200 | A | Example |
| 14 | A | 125 | 95 | 10000 | Aqueous NaCl solution | 0 | 7.0 | Cotton gauze | Dropwise addition | 1200 | A | Example |
| 15 | A | 125 | 95 | 10000 | Aqueous NaCl solution | 0 | 7.0 | Cotton gauze | Immersion (10 min) | 1200 | A | Example |
| 16 | A | 125 | 95 | 10000 | Aqueous NaCl solution | 0 | 7.0 | Mud | Spraying | 1200 | A | Example |
| 17 | A | 125 | 95 | 10000 | Aqueous NaCl solution | 0 | 7.0 | None | Spraying | 1600 or more | x | Comparative Example |
| 18 | A | 125 | 95 | 10000 | Aqueous NaCl solution | 0 | 10.0 | Cotton gauze | Spraying | 1200 | A | Example |
| 19 | A | 125 | 95 | 10000 | Aqueous NaCl solution | 30 | 7.0 | Cotton gauze | Spraying | 1200 | A | Example |
| 20 | A | 125 | 95 | 10000 | Aqueous NaCl solution | 60 | 7.0 | Cotton gauze | Spraying | 1200 | A | Example |
| 21 | A | 125 | 95 | 10000 | Aqueous NaCl solution | 70 | 7.0 | Cotton gauze | Spraying | 1200 | B | Example |
| 22 | A | 125 | 95 | 10000 | Sea salt (NaCl + MgCl₂) | 0 | 7.0 | Cotton gauze | Spraying | 1200 | A | Example |
| 23 | A | 2500 | 95 | 200000 | Aqueous NaCl solution | 0 | 7.0 | Cotton gauze | Spraying | 1200 | A | Example |
| 24 | A | 2500 | 95 | 200000 | Aqueous NaCl solution | 0 | 7.0 | Cotton gauze | Dropwise addition | 1200 | A | Example |
| 25 | A | 2500 | 95 | 200000 | Aqueous NaCl solution | 0 | 7.0 | Mud | Spraying | 1200 | A | Example |
| 26 | A | 3000 | 95 | 250000 | Aqueous NaCl solution | 0 | 7.0 | Cotton gauze | Spraying | 1200 | B | Example |
| 27 | A | — | 95 | — | Ion exchanged water | 0 | 7.0 | Cotton gauze | Spraying | 1600 or more | x | Comparative Example |
| 28 | B | 0 | 70 | 10000 | Aqueous NaCl solution | 0 | 7.0 | Cotton gauze | Spraying | 1600 | x | Comparative Example |
| 29 | B | 5 | 85 | 1000 | Aqueous NaCl solution | 0 | 7.0 | Cotton gauze | Spraying | 1000 | B | Example |
| 30 | B | 9 | 95 | 700 | Aqueous NaCl solution | 0 | 7.0 | Cotton gauze | Spraying | 1000 | B | Example |
| 31 | B | 30 | 75 | 10000 | Aqueous NaCl solution | 0 | 7.0 | Cotton gauze | Spraying | 1000 | A | Example |
| 32 | B | 40 | 95 | 3000 | Aqueous NaCl solution | 0 | 7.0 | Cotton gauze | Spraying | 1000 | A | Example |
| 33 | B | 40 | 95 | 3000 | Aqueous NaCl solution | 0 | 7.0 | Cotton gauze | Dropwise addition | 1000 | A | Example |
| 34 | B | 40 | 95 | 3000 | Aqueous NaCl solution | 0 | 7.0 | Mud | Spraying | 1000 | A | Example |
| 35 | B | 125 | 95 | 10000 | Aqueous NaCl solution | −60 | 7.0 | Cotton gauze | Spraying | 1000 | B | Example |

TABLE 3-continued

| Test number | Steel type | Estimated liquid film thickness (computation)/μm | Relative humidity of the test environment % RH | Amount of chloride supplied/ mg/m² | Solution supplied | Test temperature/ ° C. | pH | Solution-retaining material | Supplying method | Critical load stress/ MPa | Compatibility with actual environment | |
|---|---|---|---|---|---|---|---|---|---|---|---|---|
| 36 | B | 125 | 95 | 10000 | Aqueous NaCl solution | −50 | 7.0 | Cotton gauze | Spraying | 1000 | A | Example |
| 37 | B | 125 | 95 | 10000 | Aqueous NaCl solution | −20 | 7.0 | Cotton gauze | Spraying | 1000 | A | Example |
| 38 | B | 125 | 95 | 10000 | Aqueous NaCl solution | 0 | <u>3.0</u> | Cotton gauze | Spraying | 800 | x | Comparative Example |
| 39 | B | 125 | 95 | 10000 | Aqueous NaCl solution | 0 | 3.5 | Cotton gauze | Spraying | 1000 | A | Example |
| 40 | B | 125 | 95 | 10000 | Aqueous NaCl solution | 0 | 7.0 | Cotton gauze | Spraying | 1000 | A | Example |
| 41 | B | 125 | 95 | 10000 | Aqueous NaCl solution | 0 | 7.0 | Cotton gauze | Dropwise addition | 1000 | A | Example |
| 42 | B | 125 | 95 | 10000 | Aqueous NaCl solution | 0 | 7.0 | Cotton gauze | Immersion (10 min) | 1000 | A | Example |
| 43 | B | 125 | 95 | 10000 | Aqueous NaCl solution | 0 | 7.0 | Mud | Spraying | 1000 | A | Example |
| 44 | B | 125 | 95 | 10000 | Aqueous NaCl solution | 0 | 7.0 | <u>None</u> | Spraying | 1600 | x | Comparative Example |
| 45 | B | 125 | 95 | 10000 | Aqueous NaCl solution | 0 | 10.0 | Cotton gauze | Spraying | 1000 | A | Example |
| 46 | B | 125 | 95 | 10000 | Aqueous NaCl solution | 30 | 7.0 | Cotton gauze | Spraying | 1000 | A | Example |
| 47 | B | 125 | 95 | 10000 | Aqueous NaCl solution | 60 | 7.0 | Cotton gauze | Spraying | 1000 | A | Example |
| 48 | B | 125 | 95 | 10000 | Aqueous NaCl solution | 70 | 7.9 | Cotton gauze | Spraying | 1000 | B | Example |
| 49 | B | 125 | 95 | 10000 | Sea salt (NaCl + MgCl₂) | 0 | 7.0 | Cotton gauze | Spraying | 1000 | A | Example |
| 50 | B | 2500 | 95 | 200000 | Aqueous NaCl solution | 0 | 7.0 | Cotton gauze | Spraying | 1000 | A | Example |
| 51 | B | 2500 | 95 | 200000 | Aqueous NaCl solution | 0 | 7.0 | Cotton gauze | Dropwise addition | 1000 | A | Example |
| 52 | B | 2500 | 95 | 200000 | Aqueous NaCl solution | 0 | 7.0 | Mud | Spraying | 1000 | A | Example |
| 53 | B | 3000 | 95 | 250000 | Aqueous NaCl solution | 0 | 7.0 | Cotton gauze | Spraying | 1000 | B | Example |
| 54 | B | <u>—</u> | 95 | — | <u>Ion exchanged water</u> | 0 | 7.0 | Cotton gauze | Spraying | 1600 | x | Comparative Example |

A = both the critical load stress and the corrosion mode coincided with those in the actual environment
B = the critical bad stress coincided with that in the actual environment
x = either did not coincide with those in the actual environment In Examples in Table 3, the test was performed under the test conditions described in the disclosed embodiments. In Comparative Examples, at least one of the test conditions was outside the corresponding range in the embodiment, and conditions outside the numerical ranges of the disclosed embodiments are underlined. When no cracking was found in all the test specimens under certain conditions, 1600 MPa or more was placed in the critical load stress column for these conditions. The symbol "x (poor)" was given to the conditions under which the results did not coincide with those in the actual environment test (Comparative Examples). The symbol "B" was given to the conditions under which the results coincided with those in the actual environment test, and the symbol "A" was given to more preferred results. Specifically, as described above, the compatibility with the actual environment was evaluated in terms of the critical load stress and the corrosion mode (corrosion type). When both the critical load stress and the corrosion mode (corrosion type) coincided with those in the actual environment, "A" was assigned. When the critical load stress coincided but the corrosion mode was different, B" was assigned because the delayed fracture evaluation test itself was valid. When either the critical load stress or the corrosion mode (corrosion type) did not coincide with those in the actual environment, the test performed was not suitable as the delayed fracture evaluation test, and the symbol "x" was given.

Nos. 3, 5, 13, 23, and 26 are Examples using steel type A. In these Examples, conditions other than the amount of the chloride were the same, and the amount of the chloride was changed to change the liquid film thickness. In No. 3, since the amount of the chloride supplied was small, the liquid film was not formed sufficiently, and the degree of corrosion was less than that in the actual environment test. Therefore, although the cracking evaluation result (critical load stress) coincided with that in the actual environment, the environment was milder. In No. 26, the amount of the chloride was large, and the liquid film thickness was excessively large. Therefore, although the critical load stress coincided with that in the actual environment, the corrosion mode was different from that in the actual environment. Nos. 30, 32, 40, 50, and 53 are Examples using steel type B, and a similar tendency was found.

Nos. 1, 2, 4, 13, 28 to 29, 31, and 40 are Examples and Comparative Examples using steel type A or B. In these Examples and Comparative Examples, the relative humidity of the test environment and the amount of the chloride were changed to change the liquid film thickness. The thickness of the liquid film formed is determined from the relation between the relative humidity of the test environment and the amount of the chloride. In Nos. 4 and 31, the humidity was 75% RH, and the amount of the chloride was 10000 mg/m$^2$. Therefore, the state in which the liquid film is present without discontinuities (liquid film thickness: 10 μm or more) can be maintained. In Nos. 1 and 28 that are Comparative Examples, the relative humidity of the test environment was low. This relative humidity of the test environment is lower than the relative humidity at which the chloride contained in the solution absorbs moisture. Therefore, substantially no liquid film was formed, and corrosion did not proceed. This environment differs from the actual environment. In Examples in Nos. 13 and 40, the relative humidity of the test environment was 90% or more. In these Examples, the water film thickness was in the preferred range, and the corrosion state was similar to that in the actual environment, so that preferred results were obtained.

Nos. 13, 22, 27, 40, 49, and 54 are Examples and Comparative Examples in which different types of solutions were used. In Examples in Nos. 13, 22, 40, and 49, a solution containing a chloride(s) was used, and the results coincided with those in the actual environment. In Comparative Examples Nos. 27 and 54, a solution containing no chloride ions was used. Since no chloride ions were contained, the liquid film formed was not uniform, and the results did not coincided with those in the actual environment.

Nos. 8 to 10, 13, 19 to 21, 35 to 37, 40, 46 to 48 are Examples in which different test temperatures were used. In Examples in Nos. 9, 10, 13, 19, 20, 36, 37, 40, 46, and 47, the results coincided well with those in the actual environment. However, in Nos. 8 and 35, since the temperature was excessively low, the solution was frozen, and the corrosion did not proceed beyond a certain point. Therefore, although the cracking evaluation result (critical load stress) coincided with that in the actual environment, the corrosion mode did not coincide. When the temperature was excessively high as in Nos. 21 and 48, the degree of corrosion was higher than that in the actual environment. In this case, although the cracking evaluation result (critical load stress) coincided with that in the actual environment, the corrosion mode did not coincide.

Nos. 11 to 13, 18, 38 to 40, and 45 are Examples and Comparative Examples in which different pHs were used. The results in Examples Nos. 12 to 13, 18, 39 to 40, and 45 coincided well with those in the actual environment. In Comparative Examples in Nos. 11 and 38, the results were inferior to those in the actual environment. Since the pH of the solution was low, dissolution of iron was facilitated, and hydrogen ions in the solution were reduced due to the dissolution of iron, so that intrusion of hydrogen into the steel was facilitated. Therefore, the environments of the comparative examples were severer than the actual environment and the results thereof did not coincide with those in the actual environment.

Nos. 5, 7, 13, 16 to 17, 23, 25, 32, 34, 40, 43 to 44, 50, and 52 are Examples and Comparative Examples in which different solution-retaining materials were used. Nos. 5, 7, 13, 16, 23, 25, 32, 34, 40, 43, 50, and 52 are Examples in which different solution-retaining materials were used. In each of these Examples, the solution-retaining material disposed was impregnated with the solution, and the liquid film thickness could be maintained, so that the results coincided with those in the actual environment. In Nos. 17 and 44, no material having the ability to retain water was disposed, so that the liquid could not be retained. Therefore, the state of progress of corrosion differs from that in the actual environment, and the results were different from those in the actual environment.

Nos. 5 to 6, 13 to 15, 23 to 24, 32, 33, 40 to 42, 50 to 51 are Examples in which different solution supply methods were used. In Examples in Nos. 5 to 6, 13 to 15, 23 to 24, 32, 33, 40 to 42, 50 to 51, although different supply methods were used, the results coincided with those in the actual environment so long as the conditions for the liquid film thickness were satisfied.

Example 2

Next, whether the difference in the state of the edge face causes a difference in the delayed fracture evaluation was examined in Example 2 below. Test specimens with a thickness of 1.4 mm were produced using steel type A. Specifically, three working methods including shearing, laser cutting, and edge face grinding after shearing were used to produce the test specimens, and the test specimens were bent into a U shape as in Example 1. An edge face of each specimen was evaluated in the manner of the disclosed embodiments, and the results are shown in Table 4.

TABLE 4

| Steel type | State of worked edge face | Estimated liquid film thickness (computation)/μm | Relative Humidity of the test environment | Amount of chloride supplied/ mg/m$^2$ | Solution supplied | pH | Solution-retaining material | Supplying method | Critical load stress/ MPa |
| --- | --- | --- | --- | --- | --- | --- | --- | --- | --- |
| A | Shearing | 125 | 95% RH | 10000 | Aqueous NaCl solution | 7.0 | Cotton gauze | Spraying | 1200 |
| A | Laser cutting | 125 | 95% RH | 10000 | Aqueous NaCl solution | 7.0 | Cotton gauze | Spraying | 1600 |
| A | Grinding (finished with No. 2000) | 125 | 95% RH | 10000 | Aqueous NaCl solution | 7.0 | Cotton gauze | Spraying | 1600 |

As can be seen from Table 4, when the evaluation was performed in the manner of the disclosed embodiments, the cracking evaluation results were different depending on the state of the edge face even when the same steel type A was used. Specifically, by using the disclosed embodiments, it is possible to evaluate what type of edge face state is effective in terms of the delayed fracture characteristics.

The disclosure is not intended to be limited to the above-described embodiment, and various modifications can be made. For example, a metal material to be evaluated is generally a steel material such as a steel sheet, but this is not a limitation. Metal materials such as Ti and Al may be used. The delayed fracture characteristic evaluation method of the disclosed embodiments can evaluate the delayed fracture characteristics of metal materials accurately. Therefore, metal materials (particularly steel materials such as steel sheets) selected and evaluated by the evaluation method have good delayed fracture characteristics.

The invention claimed is:

1. A method for evaluating delayed fracture characteristics of an edge face of a metal material, the method comprising:
    placing a solution-retaining material impregnated with a solution containing a chloride and having a pH of 3.5 or more on the edge face; and
    corroding the edge face by maintaining a state in which the solution-retaining material is held at a deliquescence humidity of the chloride, wherein
    the edge face is an outer edge face of the metal material, and
    the solution-retaining material is placed on only the outer edge face of the metal material.

2. The method for evaluating the delayed fracture characteristics of the metal material according to claim 1, wherein the corrosion is continued while a thickness of a liquid film of the solution is maintained in a range of 10 μm to 2500 μm.

3. The method for evaluating the delayed fracture characteristics of the metal material according to claim 1, wherein the corrosion is performed at a test temperature in a range of −50 to 60° C.

4. The method for evaluating the delayed fracture characteristics of the metal material according to claim 1, wherein, the placing step includes supplying the solution containing the chloride and having the pH of 3.5 or more to the edge face before placing the solution-retaining material on the edge face.

5. The method for evaluating the delayed fracture characteristics of the metal material according to claim 4, wherein the solution is supplied by immersion for shorter than 15 minutes, atomizing, showering, or dropwise addition.

6. The method for evaluating the delayed fracture characteristics of the metal material according to claim 1, wherein the metal material is a steel sheet having a tensile strength of 1180 MPa or more.

7. The method for evaluating the delayed fracture characteristics of the metal material according to claim 1, wherein
    the solution-retaining material is a material that has void spaces so that the solution is retained by capillarity.

* * * * *